Figure 1:
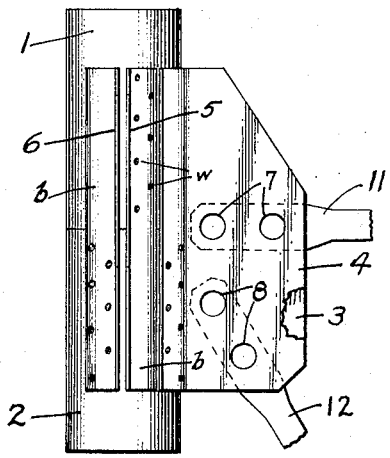

Nov. 18, 1958 R. W. WEEKS ET AL 2,860,897
ROD JOINT
Filed March 15, 1951

INVENTORS,
ROBERT W. WEEKS,
PETER G. PARK

BY Ralph B. Stewart
ATTORNEY

United States Patent Office 2,860,897
Patented Nov. 18, 1958

2,860,897
ROD JOINT

Robert W. Weeks and Peter G. Park, West Chester, Pa., assignors to Wind Turbine Company, a corporation of Pennsylvania Application March 15, 1951, Serial No. 215,716

2 Claims. (Cl. 287—54)

This invention relates to a splice or joint construction for metal rods used for frame structures such as towers, derricks, scaffolds and the like which are fabricated from interconnected rod sections. The invention has to do more particularly with that class of splice construction in which splicing plates or wings rigidly carried by relatively aligned interconnected rod sections of a structure are connected to each other to maintain said sections in spliced relation, the splicing plates also providing a means whereby other structural members may be connected in angular relation to the aligned sections. The term "rod" is used in a generic sense to apply to elongated structural members of either solid or hollow section.

Such splice constructions as heretofore known have employed a plurality of parts separable from the rod sections, and which have had to be assembled about the spliced ends of the sections at the time of joining or splicing the latter, with resultant difficulty and loss of time.

A primary object of the present invention is to provide an improved splice construction of the class above mentioned which involves fewer and simpler parts than heretofore, and wherein the splice plates or wings are permanently associated with their respective sections to be disposed in relatively longitudinally overlapping relation incidentally with the placing of the rod sections in end to end relation, thereafter requiring only the application of conventional connecting means between the plates in order to secure the spliced sections together and hold them against relative movement.

It is a further object to provide such a splice construction wherein other or auxiliary structural elements, such as cross braces and diagonals, may be firmly clamped between and rigidly positioned by the splicing plates, the clamping action being produced by the same means which connects the splicing plates together. An important feature resulting from this clamping arrangement is that the terminal ends of the auxiliary structural element or elements are positioned in a common plane with the axis of the spliced sections so that any thrust or tension transmitted to the sections through these members will be devoid of any torsional or twisting component.

It is a further object to arrange the cooperating splice plates in longitudinally overlapping relation at a location abreast of the juncture of said aligned sections, whereby the ends of the auxiliary structural members or braces may be secured between the overlapping plates at this location to exert a bracing force transverse to the sections at the most effective point possible, namely in the plane of the connected ends.

Figure 3:
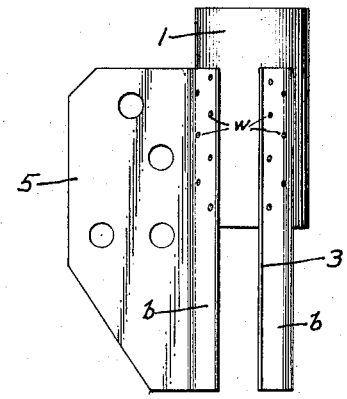
Figure 2:
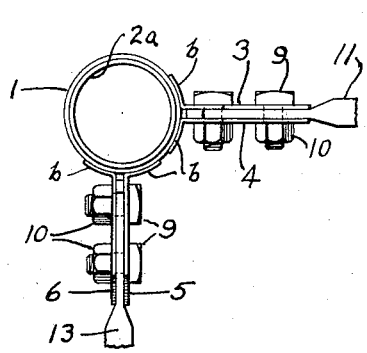
Figure 4:
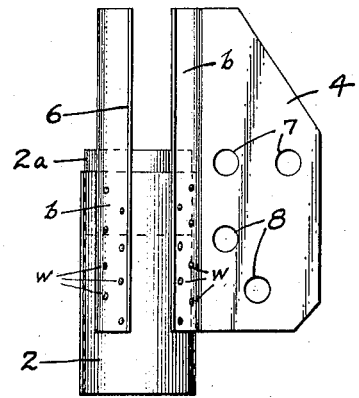

Additional objects and advantages will be apparent from the following detailed description considered in conjunction with the accompanying drawing, in which:

Figure 1 represents a front elevation of a pair of joined or spliced tubular metal rod sections embodying the splice construction of my invention, the associated end portions of cross and diagonal braces or auxiliary structural members being shown fragmentarily;

Figure 2, a plan view of the structure illustrated in Figure 1;

Figure 3, a side elevation of the upper tubular section and its associated splicing structure as viewed from the right in Figure 1; and, Figure 4, a front elevation of the lower tubular section with its associated splicing structure.

Referring now in detail to the accompanying drawing, we have shown therein a splice construction in which two elongated rod sections 1 and 2 respectively, which may represent sections of an upright leg or post in a tower or scaffold, are connected in end to end aligned relation in a manner which will permit some rotary play or movement therebetween, as may be desired in order to permit a clamping movement of their respective splice plates as hereinafter mentioned. The rod sections are shown in the drawing as being relatively short but they may be of any desired length.

Preferably these rod sections 1 and 2 are of tubular stainless steel construction of circular cross section. Accurate alignment of the adjoining ends of these sections 1 and 2, and the desired rotary connection therebetween, is preferably attained by means of an axial projection which may be in the form of a bushing 2a secured within one section 2, the bushing being telescopically and rotatably received in the hollow end of the other section 1.

The arrangement is such therefore that the abutting end edges of the two sections 1 and 2 will accurately engage and register with each other throughout their entire circumference to thus efficiently resist longitudinal compressive forces on the legs or posts of which the sections 1 and 2 form a part.

The two rod sections are joined together by one or more pairs of overlapping splicing plates, one plate of each pair being secured to one rod section and the other plate being secured to the other rod section, and the two plates being clamped together by suitable clamping means. Two such pairs of splicing plates are used in the splice shown in the drawing.

As shown in Figure 2, two pairs of radially projecting, relatively circumferentially spaced splice plates 3—4 and 5—6 are provided and are formed preferably of heavy gauge sheet metal such as steel. Plates 3 and 5 are rigidly secured to the section 1 in any suitable manner, though in the preferred embodiment each plate is provided with an integral relatively angularly disposed base or flange $b$ of arcuate cross section secured flush against the cylindrical exterior or side wall of section 1, as by spot welding at the points $w$. Such bases $b$ are preferably made longitudinally coextensive with their respective plates 3 and 5 so that, in addition to serving as connecting means between the section 1 and their respective plates, they may also reinforce the plates against longitudinal bending and each may provide a bearing surface for engaging and aligning the adjacent end portion of the adjoining section 2.

Splice plates 4 and 6 similar to those on the section 1 are disposed and mounted in similar manner on section 2 for cooperation with the respective splice plates 3 and 5 as hereinafter described. It will be noted however that the bases $b$ of plates 4 and 6 are arranged on the opposite circumferential side of their respective plates with respect to the bases $b$ of plates 3 and 5, this being necessary in the preferred embodiment in order to avoid interference between the bases of relatively cooperating plates 3—4 and 5—6, as they are brought into operative relation.

Inasmuch as the splice plates of each cooperating pair 3—4 and 5—6 are formed and function in similar manner, a detailed description of the relative disposition and cooperation between the plates 3—4 of but one pair will suffice for and be equally applicable to both.

In accordance with a primary feature of the invention one or both of the splice plates 3, 4 project axially or longitudinally beyond the ends of their respective tubular sections 1, 2, whereby in the joined or spliced relation of these sections either or both of the plates 3, 4 will project across the juncture of sections 1 and 2. Thus the plates 3, 4 will be at least partially and preferably wholly in axially overlapping or longitudinally coextensive relation, as shown in Figure 1.

Formed in each of the plates 3, 4 are registering holes 7 and 8 preferably arranged in pairs and through which may be passed suitable clamping means such as bolts 9 having nuts 10 threaded thereon so that the two plates 3, 4 may be clamped together in a manner to strongly resist forces tending to separate or produce relative movement between sections 1 and 2.

In addition to securing the leg sections 1 and 2 in end to end aligned relation, the plates 3 and 4 are also adapted for use in securely connecting other structural members in angular relation to the leg sections 1 and 2. To this end, the plates 3 and 4 may be somewhat laterally or circumferentially spaced, preferably lying in radially parallel planes and on opposite sides of an axial plane through the connected sections 1 and 2, so that other structural members, as exemplified by the tubular metal cross brace 11 and the tubular diagonal 12, may have their flattened end portions secured therebetween by the bolts 9 which will preferably pass through holes formed in the interposed end portions of members 11 and 12.

Due to the disposition of members 11 and 12 between the plates 3 and 4, the bolts 9 and nuts 10 draw the plates 3 and 4 toward each other and thereby exert a strong clamping action on the interposed ends of members 11 and 12. This will contribute materially to the strength and rigidity of a structure in which the invention is utilized.

Also, the disposition of the members 11 and/or 12 between the plates 3 and 4 will cause the longitudinal axes of these members to lie in a plane passing through the longitudinal axis of sections 1 and 2 so that any thrust or tension transmitted through these members to sections 1, 2 will not tend to twist the leg sections 1 and 2.

Where the splice plates 3 and 4 both project past the connected ends or juncture of their sections 1 and 2, as in the preferred embodiment of the invention, they provide an overlapping area disposed laterally abreast of the juncture which will permit disposition of the cross brace 11 with its end in true alignment with the juncture and in the plane thereof. Thus the cross brace 11 may be most efficiently located for proper bracing action.

Obviously cross and diagonal braces corresponding to members 11 and 12, may be similarly positioned and clamped between the cooperating splice plates 5—6, as by the bolts 9 and nuts 10, in the same manner as with plates 3 and 4.

From the foregoing it will be readily apparent that in assembling a splice or joint in accordance with the invention, all that is necessary is to place the sections 1 and 2 in aligned position, with the plates 3 and 4 respectively disposed opposite the plates 5 and 6, and then to move these sections axially together into abutting relation wherein the bushing 2a is telescopically received in the end of section 1. Thereafter, the members 11, 12, 13 and 14 may be positioned between their respective plates and loosely secured in place by the bolts 9, following which turning the nuts 10 tight on their respective bolts will draw the plates 3—4 and 5—6 of each pair into firm clamping engagement with the interposed members 11, 12, 13 and 14 respectively.

In this application we have shown and described only the preferred embodiment of our invention, simply by way of illustration, but the several details thereof may be modified in various ways, all without departing from the invention. Accordingly, the drawing and description herein are to be construed as merely illustrative in nature and not as exclusive.

Having thus described our invention, we claim:

1. A splice construction, comprising a pair of tubular rod sections arranged in end-to-end relation, a flat metal splice plate having an angularly disposed flange along one edge thereof secured in face-to-face contact with the side wall of one of said sections, a flat metal splice plate having an angularly disposed flange along one edge thereof secured in face-to-face contact with the side wall of the other of said sections, both of said plates projecting radially outward from said sections and extending longitudinally beyond the ends of their respective sections into longitudinally overlapping relation, the angularly disposed flange of each plate occupying the full longitudinal extent of and stiffening its longitudinally projecting portion against lateral deflection, while abutting against the side wall of the adjacent section and thus stiffening the joint between said sections, and means firmly clamping together the overlapping portions of said plates.

2. A splice construction for structures formed of interconnected sections comprising a pair of rod sections arranged in end-to-end relation, a splice plate having an angularly disposed base portion secured to one of said rod sections, a second splice plate having an angularly disposed base portion secured to the other rod section, both of said plates projecting radially from said sections and extending longitudinally beyond the ends of their respective sections into longitudinally overlapping relation, the base of each plate occupying the full longitudinal extent of and stiffening its longitudinally projecting portion against lateral deflection, while abutting against the side wall of the adjacent section and thus stiffening the joint between sections, said plates lying in spaced relation on opposite sides of and parallel to an axial plane of said sections, a rigid frame member received between the overlapping portions of said plates, and clamping means passing through registering apertures in said plates and said frame member for maintaining said plates in tight clamping engagement with said member and also serving to firmly secure said member, said plates and said sections against relative displacement.

References Cited in the file of this patent

UNITED STATES PATENTS

| | | |
|---|---|---|
| Re. 16,996 | Speakman et al. | June 12, 1928 |
| 406,683 | White | July 9, 1889 |
| 833,221 | Kelley | Oct. 16, 1906 |
| 1,197,858 | Redman | Sept. 12, 1916 |
| 1,486,549 | Schuette | Mar. 11, 1924 |
| 1,791,107 | Speakman et al. | Feb. 3, 1931 |
| 2,404,276 | Cohen | July 16, 1946 |